United States Patent
Arceneaux (10) Patent No.: US 10,062,059 B2
(45) Date of Patent: Aug. 28, 2018

(54) SECURE ELECTRONIC COUPON DELIVERY TO MOBILE DEVICE

(75) Inventor: Joseph Arceneaux, San Francisco, CA (US)

(73) Assignee: ORANGE, Paris (FR)

( * ) Notice: Subject to any disclaimer, the term of this patent is extended or adjusted under 35 U.S.C. 154(b) by 450 days.

(21) Appl. No.: 12/538,021

(22) Filed: Aug. 7, 2009

(65) Prior Publication Data

US 2010/0036772 A1    Feb. 11, 2010

Related U.S. Application Data

(60) Provisional application No. 61/087,439, filed on Aug. 8, 2008.

(51) Int. Cl.
*G06Q 20/04* (2012.01)
*G06Q 20/32* (2012.01)
(Continued)

(52) U.S. Cl.
CPC ....... *G06Q 20/0457* (2013.01); *G06Q 20/045* (2013.01); *G06Q 20/32* (2013.01);
(Continued)

(58) Field of Classification Search
USPC ........................................... 705/14.1, 16, 64
See application file for complete search history.

(56) References Cited

U.S. PATENT DOCUMENTS 5,809,145 A * 9/1998 Slik et al. .................. 705/52
7,114,179 B1    9/2006 Ritter et al.
(Continued)

FOREIGN PATENT DOCUMENTS

WO    0141081 A2    6/2001
WO    0193120 A1    12/2001
(Continued)

OTHER PUBLICATIONS

European Office Action dated Jun. 20, 2017 for corresponding European Application No. 09166198.3.
(Continued)

*Primary Examiner* — Tsan-Yu J Huang
(74) *Attorney, Agent, or Firm* — David D. Brush; Westman, Champlin & Koehler, P.A.

(57) ABSTRACT

A system, method, device and interface for providing and redeeming an electronic coupon that provides for authenticating access of a user to an electronic coupon server, receiving selection from the user of at least one of an event, transportation, secured location, good, authorization, and service, generating a reservation number corresponding to the selection, encrypting the reservation number based on a first string of characters that is uniquely associated with a mobile device that will be utilized for redeeming the electronic coupon, transmitting the encrypted reservation number to the mobile device, retrieving a second string of characters from the mobile device, wherein the second string of characters corresponds to the first string of characters, decrypting the encrypted reservation number on the mobile device using the retrieved second string of characters, generating the electronic coupon from the decrypted reservation number, and presenting the electronic coupon to an authentication device for redemption.

18 Claims, 4 Drawing Sheets

(51) Int. Cl.
*G06Q 20/38* (2012.01)
*G07B 15/00* (2011.01)
*G07C 9/00* (2006.01)
*H04W 12/02* (2009.01)

(52) U.S. Cl.
CPC ....... *G06Q 20/3274* (2013.01); *G06Q 20/387* (2013.01); *G07B 15/00* (2013.01); *G07C 9/00039* (2013.01); *G07C 9/00103* (2013.01); *H04W 12/02* (2013.01)

(56) References Cited

U.S. PATENT DOCUMENTS

| | | | |
|---|---|---|---|
| 7,240,034 B1 | 7/2007 | Remery et al. | |
| 7,257,545 B1 | 8/2007 | Hung | |
| 7,296,156 B2 * | 11/2007 | Marmigere | H04L 51/38 380/247 |
| 7,627,118 B2 * | 12/2009 | Kanai | G06F 21/608 380/203 |
| 7,735,132 B2 * | 6/2010 | Brown | G06Q 20/341 705/72 |
| 2001/0039620 A1 | 11/2001 | Berry et al. | |
| 2002/0035691 A1 * | 3/2002 | Kodaka | G06Q 10/02 713/185 |
| 2002/0060246 A1 | 5/2002 | Gobburu et al. | |
| 2002/0065713 A1 * | 5/2002 | Awada | G06Q 30/02 705/14.39 |
| 2002/0112171 A1 * | 8/2002 | Ginter | G06F 21/10 713/185 |
| 2003/0014315 A1 | 1/2003 | Jaalinoja et al. | |
| 2003/0120957 A1 * | 6/2003 | Pathiyal | G06F 21/6218 726/28 |
| 2003/0172037 A1 * | 9/2003 | Jung | G06Q 30/06 705/64 |
| 2003/0182242 A1 | 9/2003 | Scott et al. | |
| 2003/0236983 A1 * | 12/2003 | Mihm, Jr. | 713/172 |
| 2004/0030906 A1 | 2/2004 | Marmigere et al. | |
| 2006/0111967 A1 | 6/2006 | Forbes | |
| 2006/2004102 | 9/2006 | Kelley | |
| 2006/0224681 A1 * | 10/2006 | Wurster | H04L 51/18 709/206 |
| 2006/0248346 A1 * | 11/2006 | Shiomi | H04L 9/0847 713/184 |
| 2006/0277414 A1 * | 12/2006 | Kotani | G06F 21/32 713/189 |
| 2007/0150339 A1 | 6/2007 | Retter et al. | |
| 2007/0198856 A1 * | 8/2007 | Lee | G06F 21/85 713/190 |
| 2007/0226061 A1 * | 9/2007 | Chen | G06Q 10/0637 705/14.19 |
| 2008/0201226 A1 | 8/2008 | Carlson et al. | |
| 2008/0215894 A1 * | 9/2008 | Van Gestel | G06F 21/10 713/189 |
| 2008/0260161 A1 * | 10/2008 | Yokota | G06F 21/10 380/278 |
| 2010/0036772 A1 * | 2/2010 | Arceneaux | G06Q 20/045 705/50 |

FOREIGN PATENT DOCUMENTS

| | | |
|---|---|---|
| WO | 0242926 A1 | 5/2002 |
| WO | 02091312 A2 | 11/2002 |
| WO | 2006090172 A2 | 8/2006 |
| WO | 2008083105 A2 | 7/2008 |

OTHER PUBLICATIONS

European Search Report dated Sep. 30, 2009 for European Application No. 09166198.

* cited by examiner

SECURE ELECTRONIC COUPON DELIVERY TO MOBILE DEVICE

CROSS-REFERENCE TO RELATED APPLICATIONS

This application claims the benefit of U.S. Provisional Patent Application No. 61/087,439, filed Aug. 8, 2008.

FIELD OF THE PRESENT SYSTEM

The present system relates to at least one of a method, user interface and apparatus for enabling a secure electronic coupon delivery to mobile device.

BACKGROUND OF THE PRESENT SYSTEM

Mainstream use of coupons, such as tickets for entry into events, transportation, secured locations and as redemption certificates for goods, services, etc., has generally changed very little in the many years in which such security measures were instituted to control access of the public to these events, transportation, secured locations, goods, services, etc. Generally either an unlimited use or limited use coupon is issued to a coupon user and a security mechanism and/or security personal are provided in proximity to an access controlled event, transportation, secured location and/or prior to dispersing goods, services, etc. The coupon can take the form of a physical token, ID card, ticket, etc. that is inspected by the security mechanism and/or security personnel to determine the authenticity of the coupon and/or the coupon user presenting the coupon.

The availability of the Internet and connected devices has had some impact on this system in that coupons may now be provided to a coupon user in electronic form and either be rendered locally, for example by printing the coupon, or may be presented directly by a device for inspection. In either event, the electronic coupon, similar to the non-electronic coupon, is provided with authenticating information to enable the security mechanism and/or security personal to determine the authenticity of the electronic coupon and/or the coupon user.

U.S. Patent Publication No. 2006/0111967 to Ronald Forbes (hereinafter, "the '967 Publication"), incorporated herein as if set out in its entirety, discloses a system for delivering coupons containing barcodes to a mobile device such as a mobile telephone. In operation, a message processor from a coupon issuing entity generates message data comprising an electronic coupon. The electronic coupon is transmitted to the mobile telephone in a form of a simple text message including barcode number and associated text, a barcode image, picture, and/or multimedia content depending on the capabilities of the mobile telephone. This system has the advantage that the electronic coupon need not be rendered (e.g., such as printed) apart from the mobile telephone in that a display of the mobile telephone is utilized for rendering the coupon at a point wherein the authenticity of the coupon and/or the coupon user is verified. For example, in a case wherein the electronic coupon is provided in a form of a barcode, the barcode is rendered on the display of the mobile telephone which is presented for examination electronically and/or visually.

This type of a system has many problems including an inability to verify from the electronic coupon whether the presenter of the electronic coupon is the intended presenter of the electronic coupon. For example, the intended coupon presenter may simply forward the electronic coupon to additional parties with the intent of enabling the additional parties to gain access to the access controlled event, transportation, or secured location. In other scenarios, an unauthorized party may intercept delivery of the electronic coupon again with the intent of gaining unauthorized access.

U.S. Pat. No. 7,114,179 to Rudolf Ritter et al. (hereinafter, "the '179 Patent"), incorporated herein as if set out in its entirety, discloses a system for ordering, loading, and using coupons for access to access-controlled service devices, in which coupons are ordered from a reservation center through transmission of order data including a call number of a mobile telephone to which the electronic coupon is to be transmitted and stored. The data exchange between this memory module and a reading device of the service device takes place over a contactless interface. Decisions about the access authorization of the user of the communications terminal are made, for example, in the reading device or in the communications terminal, taking into account the information contained in the electronic coupon, for example, limited to a digitally signed ticket number. In accordance with the decision, access to the service device is given or denied to the user through an access device connected to the reading device. While the '179 Patent transmits the electronic coupon to a phone number of a mobile telephone that is provided when the electronic coupon is ordered and a digital signature is provided by the mobile telephone to verify the authenticity of an authenticating device, the '179 Patent still has problems. The '179 Patent transmits the electronic coupon to the mobile telephone without security measures so that the electronic coupon may still be intercepted and/or forwarded to unauthorized third parties.

None of these prior systems provides a system for electronic coupon distribution that is secure from third party interception and/or intended illicit distribution to third parties.

SUMMARY OF THE PRESENT SYSTEM

It is an object of the present system to overcome disadvantages and/or make improvements in the prior art.

The present system includes a system, method, device and interface for providing and redeeming an electronic coupon. The system, method, device and interface provide for authenticating access of a user to an electronic coupon server; receiving selection from the user of at least one of an event, transportation, secured location, good, and service; generating a reservation number corresponding to the selection; encrypting the reservation number based on a first string of characters that is uniquely associated with a mobile device that will be utilized for redeeming the electronic coupon; transmitting the encrypted reservation number to the mobile device; retrieving a second string of characters from the mobile device, wherein the second string of characters corresponds to the first string of characters; decrypting the encrypted reservation number on the mobile device using the retrieved second string of characters; generating the electronic coupon from the decrypted reservation number; and presenting the electronic coupon to an authentication device for redemption.

In one embodiment, entrance of a first password may be solicited separate from the authenticating act. In this embodiment, encrypting the reservation number may include concatenating the reservation number with the first password and encrypting the concatenated reservation number and first password. Further, entrance on the mobile device of a second password that corresponds to the first password may be solicited. Decrypting the encrypted reservation number includes separating the first password from the reservation number utilizing the second password. Concatenating the reservation number with the first password may include appending the reservation number to a beginning portion of the first password. The first password may be compared to the second password. In this embodiment, the electronic coupon may only be generated if the first password equals the second password.

In a case wherein the first password does not equal the second password, entrance on the mobile device of the second password may be re-soliciting a predetermined number of times before presentation of the electronic coupon is disabled. In one embodiment, one or more of the actions related to generating the electronic coupon may be initiated in response to an interaction between the mobile device and the authentication device. In a further embodiment, the encrypted reservation number may include readable portions prior to decryption that indicate what the electronic coupon may be redeemed towards. In this way, the user may be able to confirm that the subsequently generated electronic coupon corresponds to the intended goods, services, etc. Presentation of the electronic coupon may include rendering a barcode representation of the electronic coupon on a display of the mobile device, scanning the barcode using the authentication device, and comparing the scanned barcode to a reservation number received from the electronic coupon server.

In an embodiment wherein the mobile device is a mobile telephone, the electronic coupon server may be a mobile operator server associated with the mobile telephone. To increase security of the present system, the system of encrypting and decrypting the reservation number may be maintained as a secret. In an embodiment wherein the mobile device is a mobile telephone, the characters utilized for encrypting and decrypting the reservation number may correspond to an International Mobile Equipment Identity number (IMEI) of the mobile telephone.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. For example, an operative coupling may include a wired and/or wireless coupling to enable communication between a coupon user's device, a coupon authentication device, a coupon server and related devices and corresponding user input/output devices. A further operative coupling, in accordance with the present system may include one or more couplings between the coupon authentication device and the coupon server and related devices. For example, the coupon authentication device may couple via a secure coupling to the coupon server and related devices for a transfer of information related to the electronic coupon to enable the coupon authentication device to authenticate the electronic coupon. In addition, the coupon user's device, utilizing information visible on a display of the coupon user's device may couple wirelessly, such as utilizing a mobile communication network or a short area coupling such as provided by Bluetooth wireless coupling transmitter/receivers, to the coupon server for the purposes of initiating a purchase of rights that are provided ultimately in a form of an electronic coupon as described further herein. Other operative couplings would readily occur to a person of ordinary skill in the art and are intended to be encompassed by the present system and claims that follow.

The term "electronic coupon" and formatives thereof as utilized herein refer to an authorization that is provided to an electronic coupon holder and that is accepted and authenticated by a coupon authentication device, such as an airline airplane terminal, to identify the electronic coupon holder and to verify rights associated with the electronic coupon, such as a right to gain access to a controlled location and/or service. In addition, the term electronic coupon as utilized herein should be understood to include an identification that may be utilized to gain access to events, transportation, secured locations, to authorize one or more given acts, such as an authorization to drive a car, to enable use of a device, such as car, computer, and/or any other suitable device, to posses a handgun, hunt, fish, perform certain roles such as attorney, journalist, or clergy and/or that may be redeemable for goods, services, etc. In fact, due to the security provided by the present system, an electronic coupon in accordance with the present system may be utilized to replace any prior system wherein a card or rendered (e.g., printed, displayed, etc.) authorization is provided to a user. Accordingly, the description contained herein should be understood to encompass each of these potential uses.

The term "coupon server" and formatives thereof as utilized herein refer to an infrastructure including hardware and software portions that enable coupon purchasing and distribution in accordance with the present system. For example, a coupon server may include one or more hardware and program portions. The one or more hardware and program portions may be distributed throughout a network, such as the Internet, or may be centralized. The program portions may include portions that are run at a server or may include program portions that are run from a user device. Other architectures and combinations of hardware and software making up what is termed herein the coupon server would readily occur to a person of ordinary skill in the art and are intended to be encompassed by the present system and claims that follow.

In accordance with the present system and as described herein, an electronic coupon may be readily utilized for gaining access to events, transportation, secured locations and/or as redemption certificates for goods, services, etc. To simplify the following discussion, the present system will generally be described in terms of an electronic coupon that may be utilized for gaining access to events, transportation, and secured locations similar as a ticket may be utilized. However, in this description, it should be readily appreciated that the electronic coupon may be utilized for other purposes such as a means of authorizing a user to redeem the electronic coupon for goods, services, etc.

Figure 1:
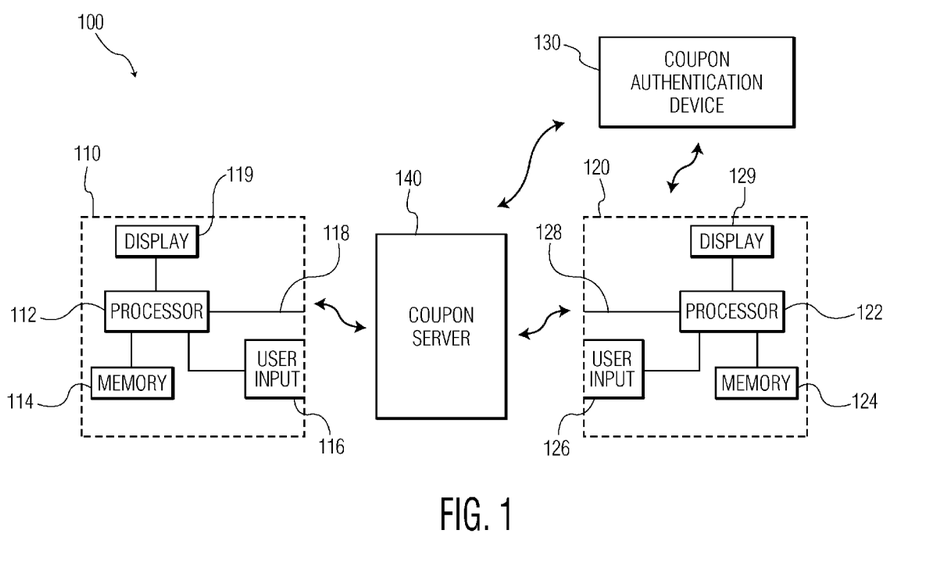
FIG. 1 shows a system in accordance with an embodiment of the present system.

FIG. 1 shows a coupon distribution and authentication system 100 including a coupon user's device 120, a further user's device 110, a coupon server and related devices 140 and a coupon authentication device 130 in accordance with an embodiment of the present system. The coupon user's device 120 includes a processor 122 operatively coupled to a memory 124, a display 129, a user input device 126 and a communication interface, illustratively shown as an input/output (I/O) device 128, such a wireless communication device. The I/O device 128 may provide coupling between portions of the present system and as such, may provide coupling utilizing one or more of radio frequency (RF) coupling, Bluetooth™ coupling, infrared coupling etc. In some cases as mentioned above, the display 129 may provide coupling by providing images and textual characters that may be utilized for interaction with other portions of the system such as between the coupon user's device 120 and between the coupon authentication device 130. Further description of these and other interactions including coupling between devices of the system are provided herein. While not shown for purposes of simplifying the following description, it is readily appreciated that each of the coupon server and related devices 140 and the coupon authentication device 130 may include processors, memories, displays and user inputs similar as shown for the coupon user's device 120 and the further user's device 110. The memories of each of the coupon user's device 120, the further user's device, the coupon authentication device 130, and the coupon server and related devices 140 may contain program portions and other data for configuring respective processors for operation in accordance with the present system. Accordingly, while the following description focuses on details of interaction within components of the coupon user's device 120, it should be understood to similarly apply to interactions of components of each of the further user's device 110, the coupon server and related devices 140 and the coupon authentication device 130.

The memory 124 may be any type of device for storing programming application data, such as to support a display and user interface (e.g., GUI), as well as other data, such as identification information, pictorial information (e.g., pictures, icons, etc.), security information (e.g., security keys, passwords), etc., that may be associated with the coupon user's device 120, the coupon authentication device 130 and/or the coupon server and related devices 140. The programming application data and other data are received by the processor 122 for configuring the processor 122 to perform operation acts in accordance with the present system. The operation acts may include controlling the display 129 to render elements in a form of an electronic coupon, a UI and/or controlling the display 129 to render other information in accordance with the present system. The processor 410 so configured becomes a special purpose machine particularly suited for performing in accordance with the present system. The user input device 126 operates through a suitably configured UI to enable interaction within the electronic coupon operations in accordance with the present system, such as to enable electronic coupon selection. The display 129 may operate as a touch sensitive display for communicating with the processor 122 and one or more of the coupon server and related devices 140 and the coupon authentication device 130 (e.g., providing password information, electronic coupon selection, electronic coupon payment, etc.) via an operative coupling, such as the I/O device 128, the display 129, etc. In these ways, a user may interact with the processor 122 including interaction within a paradigm of a UI, such as to support electronic coupon selection and redemption elements, etc. Clearly the coupon user's device 120 may all or partly be a portion of a computer system embedded in a portable device such as a mobile telephone, personal computer, personal digital assistant (PDA), converged device, such as a smart mobile telephone, etc.

The memory 124, as well as storing programming data for configuring the processor 122 for operation in accordance with the present system, may also store complementary security information to security information stored in other devices and/or systems, including the coupon authentication device 130 and/or the coupon server and related devices 140. For example, as may be readily appreciated, authentication and authorization systems utilized to enable communication between devices in accordance with the present system may have one or more pieces of information that are utilized between devices (e.g., forwarded or exchanged between devices, such as wirelessly via the I/O 128) termed in the security arts, challenge and authentication. The security information may be stored in an encrypted format in one or both of communicating devices requiring transmission, decryption, comparison, etc., during a challenge and authentication process or simply to enable an exchange or forwarding of data. For example, a mobile telephone communicating with or through a mobile network may utilize security data stored in a memory, such as the memory 124, which may include removable memories such as a Subscriber Identity Module (SIM), to communicate with and/or through the mobile network. While details of this challenge and authentication process are beyond the scope of the present system, any process known or developed for enabling coupling between devices, including coupling to a secure network, such as the coupon server and related devices 140 or directly between devices may be readily applied in accordance with the present system.

In some cases, while security information may not be exchanged directly, data that is known but not exchanged as a part of electronic coupon selection and redemption, may be utilized to authenticate a transaction as described further herein. For example, in accordance with the present system, an International Mobile Equipment Identity number (IMEI) may be known by the coupon server and related devices 140 as the coupon server and related devices 140 may include and/or may be operatively coupled to a mobile telephone service provider which stores the IMEI for each telephone that interacts with the mobile telephone service provider's mobile telephone network. In this way, while the IMEI may not be exchanged during electronic coupon selection/redemption, the IMEI may be utilized in accordance with the present system as a secret to secure an electronic coupon transaction and to bind the electronic coupon transaction to a particular user device, such as the user's mobile telephone.

The system and method described herein address problems in prior art systems. In accordance with an embodiment of the present system, the coupon user's device 120, corresponding user interface and other portions of the system 100 are provided for selecting and for receiving information that may be utilized to generate the electronic coupon and for providing a means of redeeming the electronic coupon at a controlled access location indicated in FIG. 1 as the coupon authentication device 130. In a further embodiment, the coupon user's device 120 provides a user interface (UI), such as graphical user interface (GUI) to enable operation of the coupon user's device 120 within the system 100.

The UI may be provided by an application running on the processor 122, such as part of the coupon user's device 120 and/or may be provided by an application running on a server device, such as one or more coupon server and related devices 140 accessible to the coupon user's device 120. The visual environment may be displayed by a processor on a display device and a user may be provided with an input device or system (e.g., touch display screen) to influence events or images depicted on the coupon user's device 120. For example, the coupon user's device 120 may interact with the coupon server and related devices 140 via a web browser over a network, such as the Internet, as may be readily appreciated by a person of ordinary skill in the art.

As may be further appreciated, UI's present images which describe various visual metaphors of an operating system, an application, etc., implemented on the processor/computer. In operation, a user typically moves a user-controlled object, such as a cursor or pointer, across a display screen and onto other displayed objects or screen regions, and then inputs a command to execute a given selection or operation. Other applications or visual environments also may provide user-controlled objects such as a cursor for selection and manipulation of depicted objects in a multi-dimensional (e.g., two-dimensional) space. In yet other systems, the UI may enable direct selection of objects and operations, using, for example, a touch-sensitive display device or selection button (e.g., hard and/or soft buttons) supported by the UI.

The user interaction with and manipulation of the visual environment may be achieved using any of a variety of types of human-processor interface devices that are operationally coupled to the processor controlling the displayed environment. A common interface device for a UI, such as a GUI, is a mouse, trackball, keyboard, touch and/or pressure sensitive switches and wheels, touch sensitive display, etc. For example, a touch/pressure sensitive wheel may be manipulated by a user to move a visual object, such as a cursor, depicted on a two-dimensional display surface in a direct mapping between the user manipulation and the depicted position of the cursor. This is typically known as position control, where the motion of the depicted object directly correlates to the user manipulation.

To facilitate manipulation of elements visually depicted (e.g., selection of an electronic coupon) or data stored within the coupon user's device 120, the UI may provide different views that are directed to different portions of the manipulation process. For example, the UI may present a typical GUI including a windowing environment and as such, may include menu items, pull-down menu items, etc., that are typical of those provided in a windowing environment, such as may be represented within a Mac OS XT™ Operating System graphical UI as provided by Apple Computer, Inc., such as on an iPhone™. The objects and sections of the UI may be navigated utilizing the user input device 126, such as a mouse and/or other suitable user input device. Further, the user input may be utilized for making selections within the UI such as by selection of menu items, radio buttons and other common interaction paradigms as understood by a person of ordinary skill in the art.

Similar interfaces may be provided by a device having a touch sensitive screen that is operated on by an input device such as a finger of a user or other input device such as a stylus. In this environment, a cursor may or may not be provided since a location of selection is directly determined by the location of interaction with the touch sensitive screen. Although the UI utilized for supporting touch sensitive inputs may be somewhat different than a UI that is utilized for supporting, for example, a computer mouse input, for purposes of the present system, the operation is similar in that each enables interaction within a provided UI. Accordingly, for purposes of simplifying the foregoing description, the interaction discussed herein is intended to apply to either of these systems or others that may be suitably applied.

The methods of the present system are particularly suited to be carried out by a computer software program, such program containing modules corresponding to one or more of the individual steps or acts described and/or envisioned by the present system. Such program, authentication information, etc., may of course be embodied in a computer-readable medium, such as an integrated chip, a peripheral device or memory, such as the memory 124 and/or other memory respectively coupled to the processor 122.

The memory 124 may be any recordable medium (e.g., ROM, removable memory, CD-ROM, hard drive, DVD, floppy disk, integrated circuit, and/or memory card, such as a Subscriber Identity Module (SIM)) or, in a case of one or more of the coupon user's device 120, the further user's device 110 the coupon authentication device 130 and/or the coupon server and related devices 140, may be a transmission medium (e.g., a network comprising fiber-optics, the world-wide web, cables, a wireless channel using time-division multiple access, code-division multiple access, Zigbee, WiFi, or other radio-frequency or wireless communication channel). Any medium known or developed that may store and/or transmit information suitable for use with one or more of the devices 120, 110, 130, 140 may be used as one or more of the memories in terms of the present system.

The memory 124 may configure the processor 122 to depict a UI, such as the memory 124 configuring the processor 122 to render an electronic coupon on the display 129. The memory 124 may configure the processor 122 to implement the methods, operational acts, and functions disclosed herein. The processor 122, where one or more additional processors may be provided, may be distributed or may be singular. For example, portions of the coupon user's device 120 may be embedded in a web-based application that is totally or partially provided by a remote processor. In this way, the memory 124 should be construed broadly enough to encompass any information able to be read from or written to an address in an addressable space accessible by the processor 122. With this understanding, information on a network is still within the memory 124, and/or any of the memories of devices 110, 130, 140 for instance, because the processor 122 and/or other related processors may retrieve the information from the network for operation in accordance with the present system. As may be readily appreciated, the processor 122 and the memory

124 may be locally located since in accordance with the present system, the coupon user's device 120 may be self-contained although may require coupling to further devices to interact in accordance with the present system.

Figure 2:
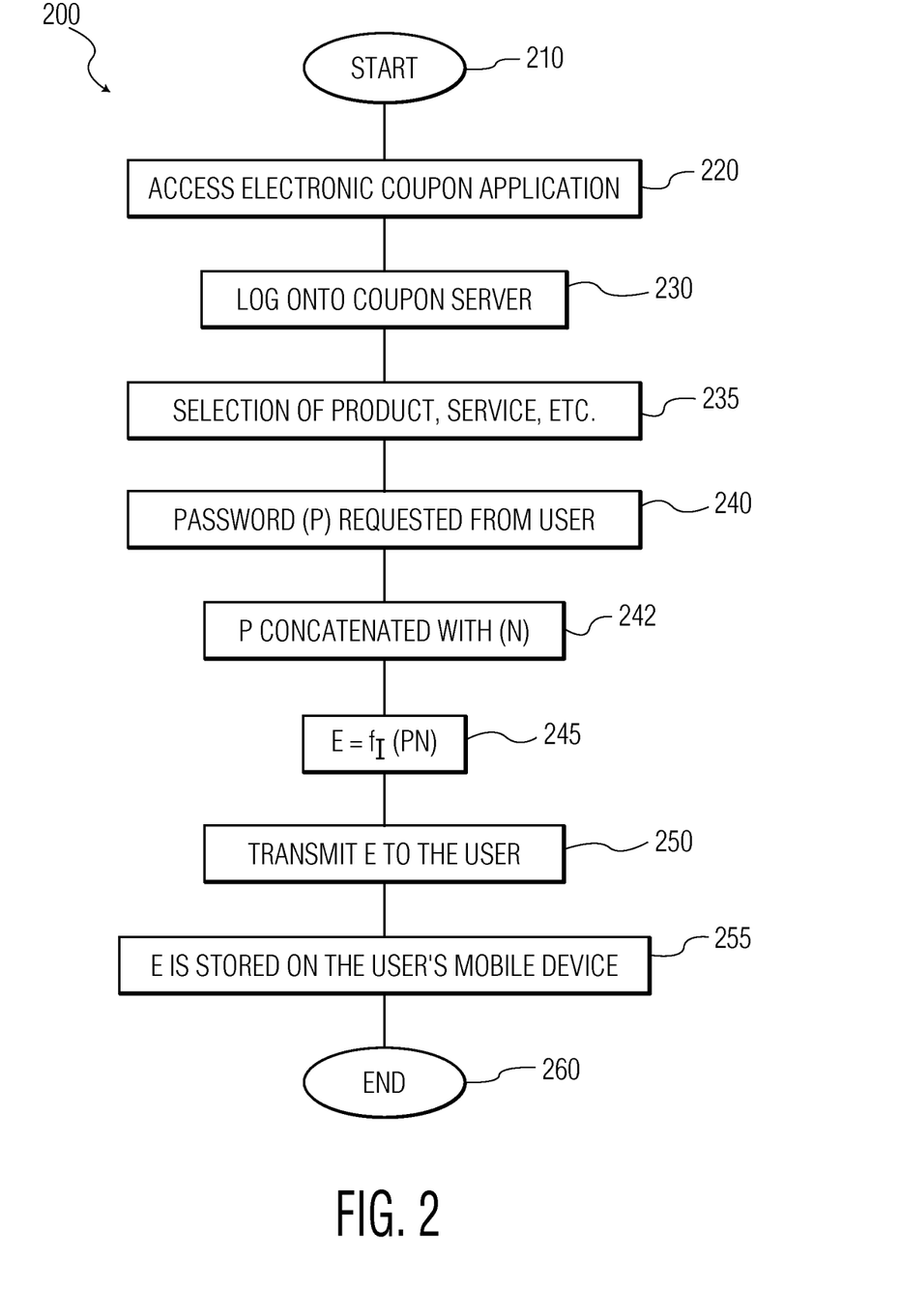
FIG. 2 shows a process flow diagram illustrating selection of an event, transportation, secured location, good, service, etc., in accordance with an embodiment of the present system.

FIG. 2 shows a process flow diagram 200 illustrating selection of an event, transportation, secured location, good, service, etc., in accordance with an embodiment of the present system. As shown, the process begins during act 210. During act 220, a user may access an application to facilitate selection of an event, transportation, secured location, good, service, etc. One or more of the application portions may be stored in the user's device (e.g., such as the mobile telephone 120 within the memory 124, and/or the further user's device 110 within a memory 114), and/or may be resident as a portion of the coupon server and related devices 140. For example, through use of a suitable UI, interaction with the present electronic coupon system may be provided. Through use of the UI, a website, for example hosted by the electronic coupon server may be assessed including portions that may be distributed to other devices. In accordance with the embodiment, interaction with the present system may be provided by interacting with the coupon server and related devices 140 through a UI of a system responsive to selection keys (soft and/or hard) provided on a device of the user, such as a mobile telephone, personal digital assistant, personal computer, etc. In any event, through use of the suitable UI for example as provided by a web browser and electronic coupon application (generally hereinafter, "the web application"), products and/or services may be presented to the user for selection.

The user, by interacting with the web application, may during act 230, log onto the coupon server and related devices, such as a customer website of a mobile operator. In this embodiment, by providing the mobile operator website as a portion of the coupon server and related devices, identification information that is particular to the user and the user's mobile telephone, may be utilized to secure the transfer and redemption of the electronic coupon, without a need to separately transfer information that is unique to the user and the user's mobile device, such as a mobile telephone. In operation, this login may comprise a secure authentication of the particular user, such as provided by a user identification (e.g., a user login ID) and corresponding password provided by the user for accessing the mobile operator website. In a case wherein the user has more than one handset associated with the user's account, the user may select one by picking a corresponding mobile telephone number on which the user wishes to utilize the electronic coupon.

Once authenticated, the user may then navigate through a secure web application dedicated to a particular service or product (such as an airline reservation system) during act 235. In accordance with an embodiment of the present system, the web application may operate within a secure portion of the mobile operator's website or may provide secure access to affiliated websites wherein goods, services, etc., are presented and offered. For example, the initial authentication process may remain valid for the aforementioned interaction. In this embodiment, once the event, transportation, secured location, goods, and/or service, etc. are selected and paid for, a reservation number corresponding to the selection may be generated during act 245 as described herein. While the system of payment is generally beyond the scope of the present system, be it sufficient to state that the user may provide identifying information sufficient to subsequently charge and/or debit the user an amount commensurate with what is selected by the user should such subsequent change and/or debit be required. For example, in a case wherein the mobile operator makes up a portion of the coupon server and related devices, the mobile operator may operate as a billing agent for a third party that provides the event, transportation, secured location, good, service, etc. With the mobile operator having authenticated the identity of the user as a valid customer of the mobile network, the mobile operator may deduct payment for the third party directly from the customer's account or may bill the customer in a normal course of generating a bill for the customer for the mobile operators other services (e.g., for the mobile telephone service). As may be readily appreciated, when a selection does not require bill generation, such as when the selection corresponds to an entrance coupon to a secured area that is restricted to designated personnel without a requirement of a corresponding fee, then no corresponding billing process is required. In this way, a subsequently generated electronic coupon, may be utilized, for example, in place of an identification badge, driver's license (with fee if so required), etc.

After user selection, a reservation number (N), corresponding to the customer's selection may be generated by the web application, the coupon server and related devices, etc. The reservation number N may then be stored on the service provider's computer and/or be securely transferred to a coupon authentication device. In accordance with the present system, the reservation number N may be symmetrically encrypted using a unique identification string of characters (e.g., alphanumeric string, number string, textual string, etc.) associated with the identified user's mobile telephone, such as an IMEI number (I) of the user's mobile telephone that was selected by the user as the mobile telephone intended for electronic coupon redemption. The encryption of the reservation number N, results in an encrypted reservation number (E) (e.g., $E=f_I(N)$) during the act 245. It should be noted that by selecting a number that is uniquely associated with the user's identified mobile telephone, not only is the transaction secure, but in addition, the subsequent redemption of the electronic coupon is bound to the user's identified mobile telephone as described further herein.

Optionally, for further security, a password (P) may be requested from the user by the web application during act 240, prior to encryption of the reservation number. In this embodiment, the password P may be concatenated in a reversible way with the reservation number N during act 242. For example, the password may be appended to a portion of the reservation number N, such as pre-pended to the beginning of the reservation number N, resulting in a combined number PN. In this embodiment, the combined number PN may be encrypted using the IMEI number I resulting in the encrypted reservation number E (e.g., $E=f_I(PN)$) during the act 245.

As may be readily appreciated, numerous different acts and/or sequences of acts may be utilized for appending the password to the reservation number N and for symmetrically encrypting the reservation number N by a number that is unique to the user's mobile telephone, such as the IMEI number. For example, the password P may be logically combined, such as by one or more of an AND/OR/XOR, etc., function that further has an advantage of obfuscating the reservation number N until subsequent removal of the password. While the further details of the acts are beyond the scope of the present system, any such symmetrical system may be suitably employed.

In accordance with the present system, after the reservation number N is reversibly encrypted by the unique number I, the encrypted number E may be transmitted to the user's mobile telephone during act 250 without fear that the encrypted number E may be utilized by other than the intended user since in accordance with the present system, only the user's mobile telephone is able to retrieve the unique number and thereby, decrypt the encrypted number E to generate the electronic coupon. In accordance with an embodiment of the present system, the exact method utilized for creating the encrypted number E may be maintained as a secret of the system that is shared between the coupon server and an application that is present on the user's mobile telephone. In this way, even if the unique number of the user's mobile telephone is discerned somehow by an unauthorized party (e.g., such as by hacking the mobile telephone operator's secure website), the secret system of decrypting the encrypted number E may still deter the unauthorized party from successfully redeeming the electronic coupon. The encrypted number E may then be transmitted by the coupon server and/or related devices to the user's mobile telephone as a text message, email message, and/or other data transmission technology of the mobile operator. In accordance with the present system, since the number E is encrypted, it may be transmitted over a standard (e.g., unprotected) channel without concern of the number E being intercepted as discussed above, although as readily appreciated, the number E may be transmitted over a secured channel, such as a secured WiFi channel, in accordance with further embodiments of the present system. In one embodiment of the present system, the encrypted number E includes a portion that is readable and/or discernable (e.g., an image) without decryption to enable the user, authorization entity, etc., to identify what the encrypted number E corresponds to, for example, to enable the user to confirm that they received the encrypted number and to confirm its intended application/use.

After the encrypted number E is stored on the mobile phone during act 255, the process of selection ends during act 260 and the user may redeem a corresponding electronic coupon at any later time by running a mobile application on the mobile telephone.

Figure 3A:
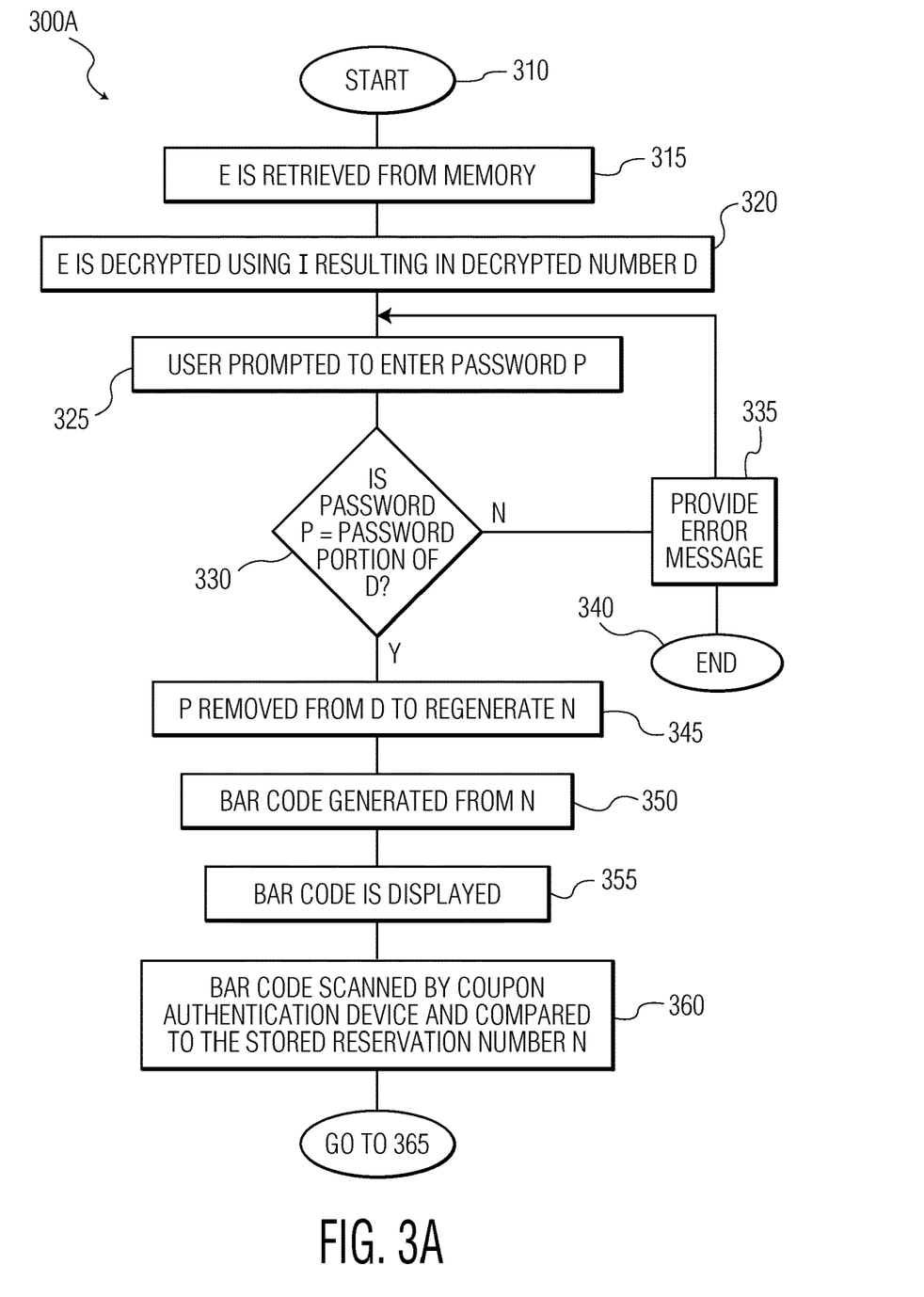
FIGS. 3A, 3B show process flow diagrams illustrating electronic coupon redemption in accordance with an embodiment of the present system.
Figure 3B:
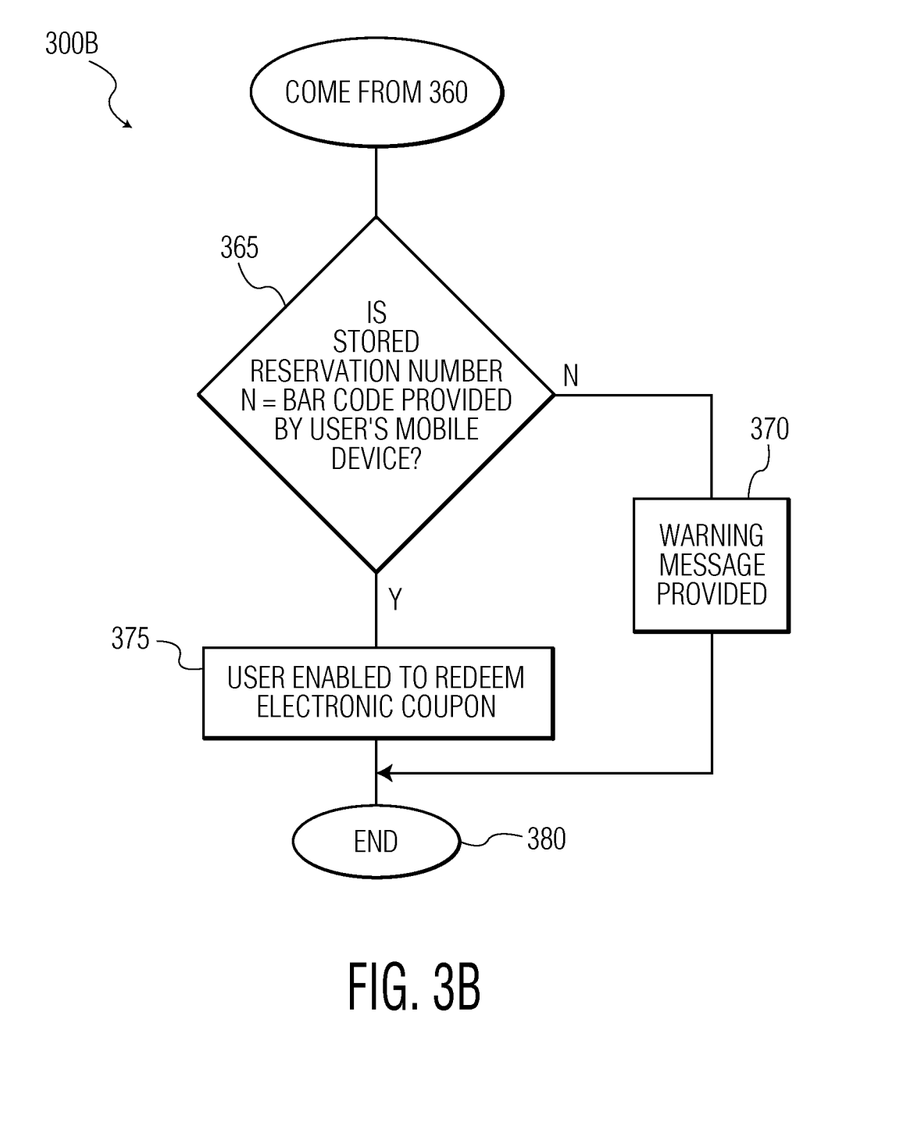

FIGS. 3A, 3B show process flow diagrams 300A, 300B illustrating an electronic coupon redemption in accordance with an embodiment of the present system. In accordance with the present system, a mobile application stored on the mobile telephone retrieves the encrypted number E, from the phone storage during act 315. The mobile application may be provided as one or more program portions, for example as a widget, an iPhone application, etc., as may be readily appreciated by a person of ordinary skill in the art. Initiation of the mobile application may be provided by a proximity condition between the mobile telephone and the coupon authentication device, and/or by user action to initiate the operation of the mobile application. For example, in one embodiment, when the mobile telephone is in proximity (e.g., within 20 feet) to the coupon authentication device, the two devices may begin a wireless communication, for example over a Bluetooth™ wireless communication channel, that initiates operation of the wireless application. In another embodiment, an infrared (IR) communication between the mobile telephone and the coupon authentication device may initiate operation of the wireless application. In a system wherein a proximity and/or interaction with the coupon authentication device is required for initiation of the mobile application and/or one or more portions of the mobile application, it may be assured that the electronic coupon is not available for being purposely or inadvertently provided to unauthorized third parties since generation of the electronic coupon is delayed until the wireless device is in the proximity of the coupon authentication device. After initiation, the mobile application may then decrypt the encrypted number E using the IMEI number (I) retrieved directly from the mobile telephone memory, resulting in a decrypted number (D) during act 320.

In a case wherein a password is utilized, then the decrypted number D corresponds to the combined reservation number and password (e.g., D=PN). In this case, the mobile application prompts the user during act 325 to enter the password that was utilized by the user at the time of electronic coupon selection. During act 330, the mobile application may then compare the password entered by the user to the password stored as a portion of D (e.g., the beginning portion in a case wherein the password P is concatenated to the beginning of the reservation number N). In a case, wherein the password P does not match (e.g., the password is invalid), the mobile application may provide a warning message to the user during act 335, for example prompting the user to attempt re-entry of the password P (e.g., a valid password) during act 325. The mobile application may be configured to enable a given number of attempts at entering the password prior to disabling further attempts and thereby, stop redemption of the electronic coupon during act 340. The disabling of further attempts may include one or more possible actions, the choice of which may depend upon the security requirements of the particular coupon as illustrated further herein. Such actions may include (but not be limited to) (a) disabling further attempts to redeem the particular coupon and/or deleting the encrypted number E (e.g., the encrypted electronic coupon), (b) disabling the entire coupon redemption application (e.g., the mobile application) so that no further redemptions may be performed without some form of out-of-band intervention (e.g., out of normal operation of coupon selection and redemption), and (c) disabling other uses of the handset (e.g., prohibiting all but emergency calls). As illustratively presented above, the actions may range from less severe to more severe actions. In addition to such disabling actions, for monitoring, auditing, and alerting purposes, the mobile handset could surreptitiously and/or openly communicate with the mobile operator to, e.g., note the failed attempt in the particular user's profile, or alert appropriate security mechanisms. In accordance with an embodiment of the present system, the action may be fixed or may vary based on the intended use of the electronic coupon. For example, for an electronic coupon that may be utilized as a driver's license, an attempt to present an invalid password one or more times (e.g., three times as may be noted and stored by one or more of the authentication device and coupon server) may result in a more severe action than may result should the electronic coupon be intended for a less restricted action, such as for entrance to a sporting event. Naturally the action may simply be determined by the party that generates the reservation number and/or by the party that performs authentication (e.g., such as may be determined by a contract between the parties). In another embodiment, the action may vary based on how many times an invalid password/electronic coupon is presented. For example, a first time that an invalid password/electronic ticket is presented, the encrypted reservation number may simply be deleted from the mobile device. A next time that an invalid password/electronic ticket is presented, the mobile application may be similarly deleted from the mobile device. In a further embodiment, a still further attempt to present an invalid password/electronic ticket may result in the mobile device being disabled. The instruction to delete the encrypted reservation number may occur by the authentication device and/or coupon server providing such an instruction to the mobile application present on the mobile device, for example, over an operable coupling there between. In general, the action in response to a both a failed or a successful authentication attempt could be performed by the mobile device, the scanning device, or the coupon server, or any combination thereof.

In a case wherein the entered password matches the password stored as a portion of the decrypted number D (e.g., the P portion of PN), the password is removed from D, resulting in regeneration of the reservation number N during act 345. In a case wherein a password is not utilized during the electronic coupon creation, then the decrypted number D may be simply equal to the reservation number N (e.g., D=N).

In any event, after the mobile application recovers the reservation number N, the reservation number N may be transformed by the mobile application into a bar code during act 350 which may then be displayed on the display of the mobile telephone during act 355. Thereafter, the bar code may be scanned, utilizing the coupon authentication device during act 360, by an agent of the product or service provider, and, during act 365, compared/validated against the reservation number stored on the provider's system (e.g., stored on the coupon server and related devices and/or the coupon authentication device) at the time of electronic coupon creation or some time thereafter prior to or concurrent with comparison/authentication. In a case wherein the reservation number stored by the service provider matches the number transmitted by the user mobile telephone, the user is enabled to redeem the electronic coupon during act 375 (e.g., gain access to a restricted area, device, etc.) and the process ends during act 380. In a case wherein the reservation number stored by the service provider does not match the number transmitted by the user's mobile telephone, the user may be provided a suitable warning message during act 370 and the process ends during act 380. As may be readily appreciated, in a case wherein the number stored by the service provider does not match the number transmitted by the user's mobile telephone, one or more actions, such as actions as described above with regard to entrance of an improper password, may be instituted to deter attempts to maliciously interact with the present system.

As may be readily appreciated, any use of the present electronic coupon system may be applied wherein it is desired that the electronic coupon is associated with a given user. For example, the electronic coupon of the present system may be applied as a transportation ticket, such as a plane, train and/or other transportation ticket. In other embodiments, the present system may be utilized in place of concert tickets that are physically sold or electronically transferred over the Internet as well as in place of an identification card that may typically be issued for restricting access to a restricted area, event, etc. For example, many airlines currently allow users to print their tickets/boarding passes on their own computers and use a bar code printed on the ticket/boarding pass to identify the ticket/boarding pass. In other instances, airlines and others are experimenting with allowing an unsecured transfer of an electronic ticket including a barcode, such as the '179 Patent shows. However, unlike prior systems, a transaction in accordance with the preset system, provides security that heretofore is not achievable by prior systems.

In an embodiment wherein the present system is utilized in place of an identity card, such as a drivers license, etc., the mobile application present on the mobile device may also be operable to initiate display of an image depicting the owner/user of the mobile device to add a further level of authentication of the presenter of the mobile device. Naturally, the image may be rendered by the mobile device, in an embodiment of the present system, before and/or after decryption of the encrypted reservation number to provide additional data that may be reviewed, authenticated by the coupon authentication device and/or authentication by authentication personnel.

The present system, as described above, is more advantageous in that customers/users are less likely to lose their mobile telephones/devices than they are to lose a piece of printed paper or identity card. Further, while an electronic and independently printable bar code sent to a mobile telephone or printed on a piece of paper may be transferred to another person, the present system ensures the bar code is strongly tied to the mobile telephone/device beyond simply being a location wherein the bar code is forwarded to as in prior systems. In addition, the present system is more secure than prior systems in that the information utilized for performing the encryption/decryption need not be shared with other than the device utilized for generating the encrypted number E and the mobile device utilized for regenerating the reservation number N.

Finally, the above discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. For example, while the present system has been generally described with regard to the user device being a mobile telephone, it should be understood that any mobile device of the user that is capable of performing the acts described herein may be readily used in accordance with the present system. Further, while use of the IMEI number of the cellular phone has been described as data that is known to both the coupon server and related devices and the user's mobile device, other data, such as a device serial number, etc. may be suitably applied in accordance with other embodiments of the present system. In these other embodiments, what is significant is that the data utilized for encrypting the reservation number is not shared during a portion of the user selection of events, transportation, secured locations, goods, services, etc. In this way, the data utilized for the encryption process is not circulated during the selection process and need not be shared/known to other than the coupon server, for generation of the encrypted number E, and the user's mobile device, for regeneration of the reservation number N. Further, the acts and/or sequence of acts utilized for generating the encrypted number E may be varied from the described embodiment as long as the encryption method is reversible (e.g., the reservation number may be regenerated from the encrypted number E) and is known to both of the device utilized for generating the encrypted number E and the mobile user device utilized for regenerating the reservation number N.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method comprising:
   redeeming an electronic coupon by a mobile device having a memory and a display device, wherein redeeming comprises acts of:
   receiving an encrypted reservation number that is encrypted using a string of characters uniquely identifying the mobile device;
   retrieving the string of characters from the memory;
   decrypting the encrypted reservation number using the retrieved string of characters to generate the corresponding electronic coupon; and
   presenting the generated electronic coupon on the display device, wherein the presented electronic coupon is configured to be read by an authentication device for redemption;
   wherein the mobile device is a mobile telephone, the encrypted reservation number is received from a mobile operator server associated with the mobile telephone, and the reservation number is concatenated with a first password prior to encryption, and the act of decrypting the encrypted reservation number further comprising requesting a second password for comparison with the first password.

2. The method of claim 1, wherein the reservation number is concatenated with the first password by appending the reservation number to a beginning portion of the first password.

3. The method of claim 1, comprising comparing the first password to the second password and only initiating generation of the corresponding electronic coupon if the first password and the second password match.

4. The method of claim 3, comprising allowing correction on the mobile device of the second password if the first password does not match the second password.

5. The method of claim 1, comprising disabling the act of presenting the generated electronic coupon if the second password incorrectly entered a predetermined number of times.

6. The method of claim 1, wherein at least the act of decrypting is initiated in response to an interaction between the mobile device and the authentication device.

7. The method of claim 1, wherein the act of receiving an encrypted reservation number comprises receiving an encrypted reservation number that includes readable portions prior to decryption, which indicate a selection that the electronic coupon may be redeemed towards.

8. The method of claim 1, wherein presenting of the generated electronic coupon comprises:
   the mobile device rendering a barcode representation of the electronic coupon on a display for the redemption.

9. The method of claim 1, wherein a number utilized for encrypting and decrypting is maintained as a secret.

10. The method of claim 1, wherein the mobile device comprises a mobile telephone and the act of retrieving the string of characters comprises retrieving a string of characters corresponding to an International Mobile Equipment Identity number (IMEI) of the mobile telephone.

11. A mobile device comprising:
    a processor having:
       a first portion configured to redeem an electronic coupon; and
       a second portion configured to receive an encrypted reservation number generated by a coupon server;
    a memory configured to maintain a first string of characters that uniquely identifies the mobile device, wherein the first string of characters was utilized to encrypt the reservation number at the coupon server;
    a third portion of the processor configured to retrieve the first string of characters from the memory and decrypt the encrypted reservation number using the first string of characters so as to generate the electronic coupon from the decrypted reservation number; and
    a display, wherein first portion of the processor is configured to redeem the electronic coupon by presenting the electronic coupon on the display, and wherein the presented electronic coupon is configured to be read by an authentication device for redemption;
    wherein the mobile device is a mobile telephone, the encrypted reservation number is received from a mobile operator server associated with the mobile telephone, and the reservation number is concatenated with a first password prior to encryption, and the third portion of the processor is further configured to request a second password for comparison with the first password.

12. The mobile device of claim 11, wherein the decrypting of the encrypted reservation number separates the first password from the reservation number utilizing the second password.

13. The mobile device of claim 12, wherein the processor is configured to compare the first password to the second password and only generate the electronic coupon if the first password matches the second password.

14. The mobile device of claim 13, wherein if the first password does not match the second password, correction of the second password is allowed.

15. The mobile device of claim 14, wherein the reservation number corresponds to a selection of at least one of an event, a mode of, means, or a component of transportation, an authorization for some act, a permission for access to a location, a device, a product, or a service.

16. The mobile device of claim 11, wherein the processor decrypts the encrypted reservation number in response to the interaction between the mobile device and the authentication device.

17. The mobile device of claim 11, wherein the electronic coupon is presented as a rendering of a barcode representation of the electronic coupon on the display.

18. The mobile device of claim 11, wherein the first string of characters corresponds to an International Mobile Equipment Identity number (IMEI) of the mobile telephone.

* * * * *